United States Patent [19]
Kobayashi et al.

[11] Patent Number: 5,518,062
[45] Date of Patent: May 21, 1996

[54] CASTING CORE AND METHOD FOR MAKING CALIPER CASTINGS

[75] Inventors: Kinzo Kobayashi; Shinji Suzuki, both of Nakakoma, Japan

[73] Assignee: Tokico Ltd., Kawasaki, Japan

[21] Appl. No.: 218,902

[22] Filed: Mar. 28, 1994

[30] Foreign Application Priority Data

Mar. 30, 1993 [JP] Japan .................................. 5-072537

[51] Int. Cl.$^6$ ...................................................... B22C 9/10
[52] U.S. Cl. ............................ 164/137; 164/28; 164/369; 164/350
[58] Field of Search ............................. 164/369, 28, 30, 164/137, 228, 340, 350

[56] References Cited

U.S. PATENT DOCUMENTS 4,705,093  11/1987  Ogino ..................................... 164/110

*Primary Examiner*—Kuang Y. Lin
*Attorney, Agent, or Firm*—Pearne, Gordon, McCoy & Granger

[57] ABSTRACT

A method of casting a plurality of caliper forms by using a mold and a core member of a special design is presented. The core member 20 has axial sections 22A, 22B formed on its each end aligned parallel to each other, and the middle section 21 between the axial sections is provided with a depression section 24A for forming a teeth section 9 of the caliper form 17A. Between the depression section 24A and the axial section 22A, there is a depression section 24B opposing the depression section 24A for forming the other teeth section 9 of the other caliper form 17B. There are internal surface forming sections 27A, 27B for forming the internal surfaces of the disc pass sections 8, respectively, between the axial section 22A and the depression section 24A, for the caliper form 17A and between the axial section 22B and the depression section 24B for the caliper form 17B. This structure of the core member 20 enables to produce two caliper forms 17A, 17B with the use of one core member 20, and the configuration, of arranging the depression section 24B disposed between the depression section 24A and the axial section 22A, allows the middle section 21 to be made short, thus saving the material cost. The overall approach of the invented method contributes significantly to the efficiency of production of the caliper forms compared with the conventional approach.

9 Claims, 5 Drawing Sheets

CASTING CORE AND METHOD FOR MAKING CALIPER CASTINGS

BACKGROUND OF THE INVENTION

1. Field of the Invention

The present invention relates to a casting core for making caliper castings for disc brakes by a metal casting process, and a method of making the caliper castings using the casting core.

2. Description of Related Art

Caliper castings as a starting material for making calipers for use in disc brakes are provided with a cylinder section, a disc pass section and a teeth section. The cylinder section is a cylindrical tube with a bottom section, and is provided with a hole section of a certain depth. The disc pass section extends outwardly approximately along the hole axis from the opening side of the hole section. The teeth section extends from the side of the disc pass section opposite to the cylinder section to the location facing the opening of the hole section of the cylinder section.

The caliper casting is made by placing a core in a mold for casting of molten FCD metal (spheroidal graphite cast iron), and when the molten metal is solidified, the resulting caliper casting is removed by breaking the core. The process therefore requires one core for making one caliper casting.

The core is provided with an axial section on one side thereof for making the hole section, and on the opposite side thereof, there is provided a depression section for making the teeth section, at about right angles to the axis of the axial section, and an internal surface forming section for forming the internal surfaces of the disc pass section disposed on the external section between the depression section and the axial section.

The conventional process for making the caliper castings presented a problem of high cost of production caused by the need to provide one core for each caliper casting.

SUMMARY OF THE INVENTION

The purpose of the present invention is to present a core member for making caliper castings for machine finishing of calipers which enable to reduce the cost of casting production, and to present a method of casting using the core member.

To achieve the above objective, the present invention presents a core member for making two caliper castings, by metal casting for the production of a caliper having a cylinder section having a hole section; a disc pass section extending from the vicinity of the opening section of the hole section of said cylinder section along the axis of said hole section; a teeth section opposing the opening section of said cylinder section, and extending from the region opposite to said cylinder section of said disc pass section to the opening section of said hole section, said core member comprising: (a) a first axial section and a second axial section formed on each end of said core member for making the respective hole section of one caliper casting and another caliper casting, wherein a respective axis of said first axial section and a respective axis of said second axial section are aligned parallel to each other; (b) a first depression section for making said teeth section of one caliper casting, oriented in a direction at right angles to the respective axes of said first axial section and said second axial section, disposed in a middle section between said first depression section and said first axial section; (c) a second depression section for making said teeth section of another caliper casting, oriented in a direction at right angles to the respective axes of said first axial section and said second axial section, disposed in the middle section between said first depression section and said first axial section; (d) a first internal surface forming section for making the internal surfaces of said disc pass section of one caliper casting, formed on the outer periphery of the middle section between the first axial section and said first depression section; (e) a second internal surface forming section for making the internal surfaces of said disc pass section of another caliper casting, formed on the outer periphery of the middle section between the second axial section and said second depression section. In further accordance with the present invention, the respective axis of the first axial section is coaxial with the respective axis of the second axial section.

A method of making caliper castings according to the present invention comprises the steps of: placing a core member between an upper mold section and a lower mold section of an outer mold; pouring molten metal into the outer mold through a spout provided on the outer mold; allowing the molten metal to solidify, and removing the core member destructively to produce two caliper casting castings; wherein the core member comprises: (a) a first axial section and a second axial section formed on each end of said core member for making the respective hole section of one caliper casting and another caliper casting, wherein a respective axis of said first axial section and a respective axis of said second axial section are aligned parallel to each other; (b) a first depression section for making said teeth section of one caliper casting, oriented in a direction at right angles to the respective axes of said first axial section and said second axial section, disposed in a middle section between said first axial section and said second axial section; (c) a second depression section for making said teeth section of another caliper casting, oriented in a direction at right angles to the respective axes of said first axial section and said second axial section, disposed in the middle section between said first depression section and said first axial section; (d) a first internal surface forming section for making the internal surfaces of said disc pass section of one caliper casting, formed on the outer periphery of the middle section between the first axial section and said first depression section; (e) a second internal surface forming section for making the internal surfaces of said disc pass section of another caliper casting, formed on the outer periphery of the middle section between the second axial section and said second depression section.

According to the method, one core member is able to produce one caliper casting and another casting form in one casting operation, thus reducing the unit cost of producing the calipers. In further accordance with the method of the present invention, the respective axis of the first axial section is coaxial with the respective axis of the second axial section.

By arranging the core member so that the second depression section of another caliper casting is disposed between the first depression and the first axial section of the one caliper casting, the distance of the middle section of the core member can be shortened. Therefore, the productivity of one mold is increased by enabling to place many core members within one mold, thus reducing the unit cost of producing the calipers.

DETAILED DESCRIPTION OF THE PREFERRED EMBODIMENT

Figure 1:
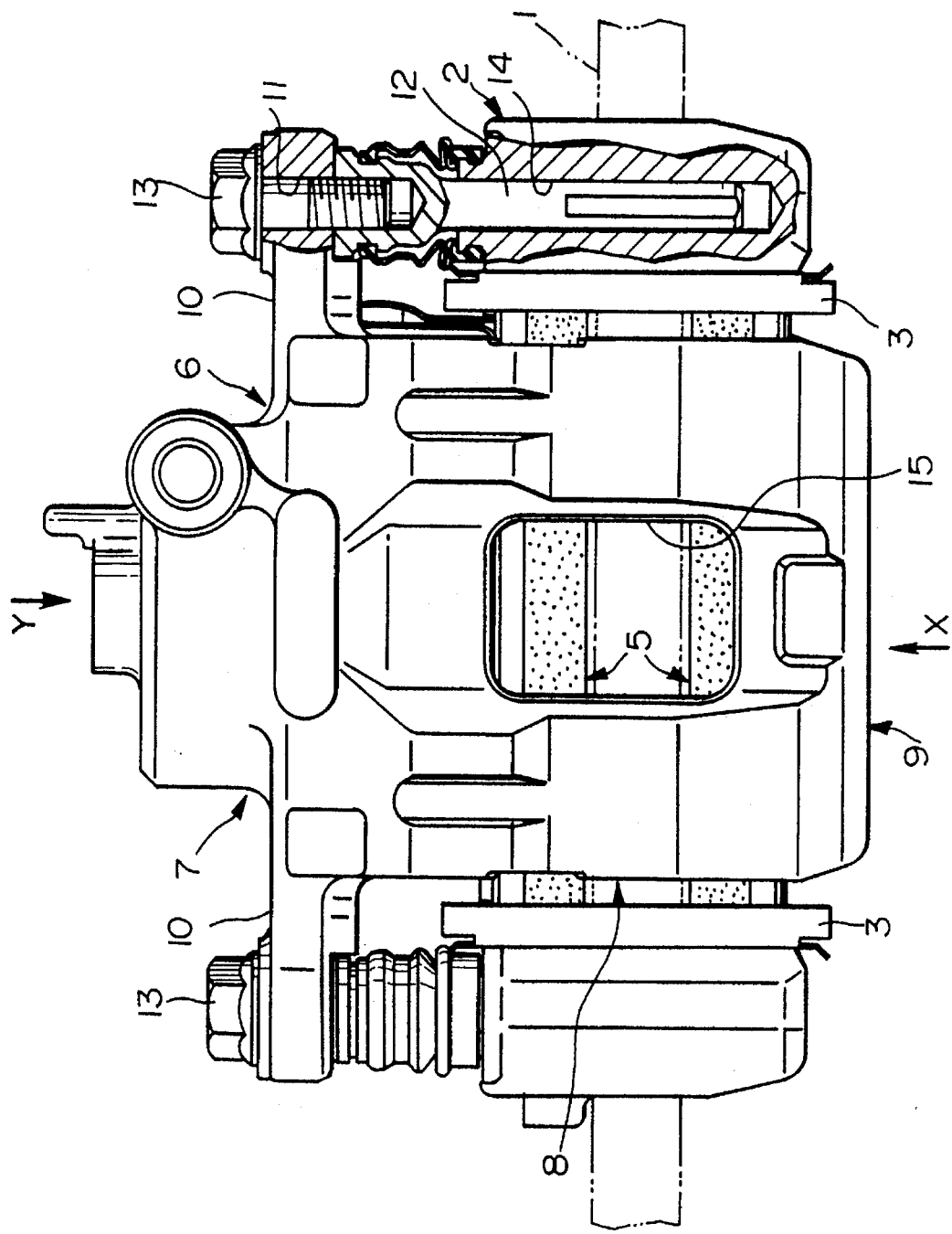
FIG. 1 is a plan view of an embodiment of a disc brake having a caliper produced by the method of making the caliper castings of the present invention.

An embodiment of a casting core (referred to as the core member hereinbelow) for making caliper castings and a method of casting using the core will be explained with reference to the drawings provided. In the following explanations, the reference to a direction is made in relation to an assembled disc brake.

First, the overall configuration of a disc brake using the caliper made by machining the caliper castings made by the method of the present invention will be explained with reference to FIGS. 1 to 3.

The disc brake comprises: a disc 1; a carrier 2; a pair of pad retainers 3; a pair of pads 5; and a caliper 6.

The carrier 2 is disposed straddling the disc 1 in its radial direction on a non-rotating section of the vehicle.

The pair of retainers 3 are disposed separately (shown as left/right directions in FIGS. 1 to 3) so as to oppose each other along the periphery of the disc.

The pair of pads 5 are disposed with the disc 1 intervening between the pads 5, and are engaged with the pad retainer 3 at the circumferential ends of the pads 5. The pads 5 are retained in the pad retainer 3 so as to be freely slidable therebetween in the axial direction of the disc 1 (vertical direction in FIG. 1, and perpendicular to the plane of the paper in FIGS. 2 and 3).

The caliper 6 is supported by the carrier 2 so as to be freely slidable in the axial direction of the disc 1. Under the hydraulic action of the brake liquid, the caliper 6 clamps the disc 1 by pressing each of the pads 5 against the opposing surfaces of the disc 1. This motion provides the braking action of the disc brakes.

The caliper section 6 comprises the cylinder section 7, the disc pass section 8 and the teeth section 9.

The cylinder section 7 is a cylindrical-shaped container and is provided with an engagement cavity (not shown) extending along the axial direction of the disc 1. A piston (not shown) is freely slidably disposed in the engagement cavity.

Figure 2:
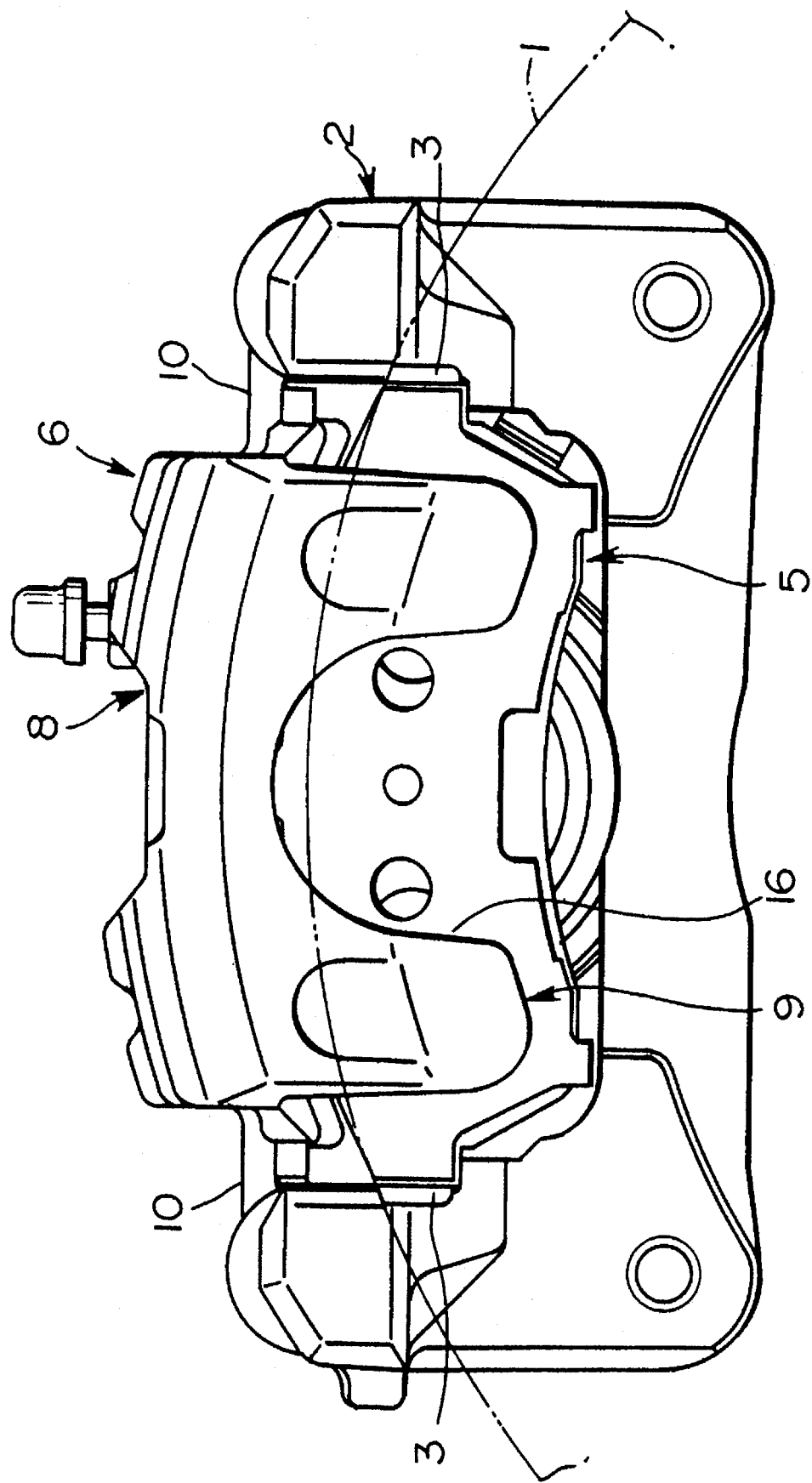
FIG. 2 is a view of the caliper of the embodiment seen in the direction of X shown in FIG. 1.
Figure 3:
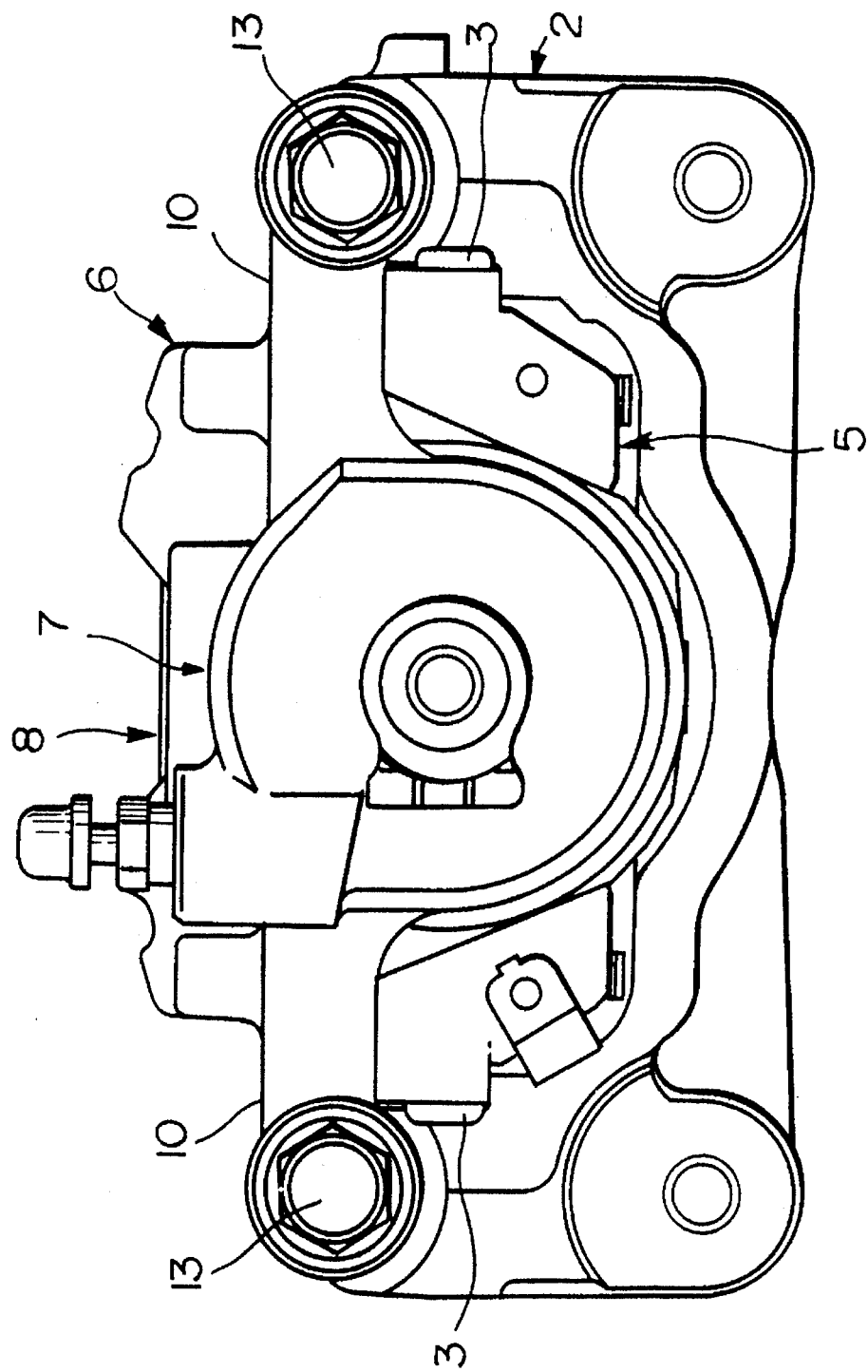
FIG. 3 is a view of the caliper of the embodiment seen in the direction of Y shown in FIG. 1.

The disc pass section 8 is approximately plate-shaped, and extends outwardly in the axial direction of the disc 1 from the end, which is the opening side of the engagement cavity of the cylinder section 7 located radially outward of the disc 1 (the top side in FIGS. 2 and 3).

The teeth section 9 extends from the side of the disc pass section 8 opposite the cylinder section 7 along the radially inward direction of the disc 1, opposing the engagement opening side of the cylinder section 7.

The cylinder section 7 comprises an arm section 10 which extends sideways from circumferential ends of the cylinder section 7 approximately in the circumferential direction of the disc 1. Near the tip end of the arm section 10, there is a bolt hole 11 extending in the axial direction of the disc 1.

A pin 12, extending in the axial direction of the disc 1 towards the teeth section 9, attaches the tip end of the arm section 10 by means of the bolt 13 passing through the bolt hole 11.

The pin 12 is engaged in a sliding guide hole 14 which extends in the axial direction of the disc 1. The sliding action of the pin 12 in the slide guide hole 14 causes the sliding motion of the caliper 6 with respect to the carrier 2 in the axial direction of the disc 1.

Under the pressing action of the brake fluid pressure, the piston (not shown) in the cylinder section 7 moves towards the teeth section 9, thereby sliding the caliper 6 with respect to the carrier 2 and pressing each pad 5 on each side of the disc 1 against the disc 1 while clamping both pads 5 between the piston and the teeth section 9.

As shown in FIG. 1, there is a window section 15, formed in a specific middle region of the disc pass section 8, passing through the disc pass section 8 from the disc side to the opposite side.

As shown in FIG. 2, there is provided a groove section 16 of a roughly semi-circular shape, located on the radially inward side of the teeth section 9 and at about the circumferential middle region of the teeth section 9. The widthwise center position of the teeth section 9 in the circumferential direction is located on the axial extension of the engagement hole (not shown).

Figure 4:
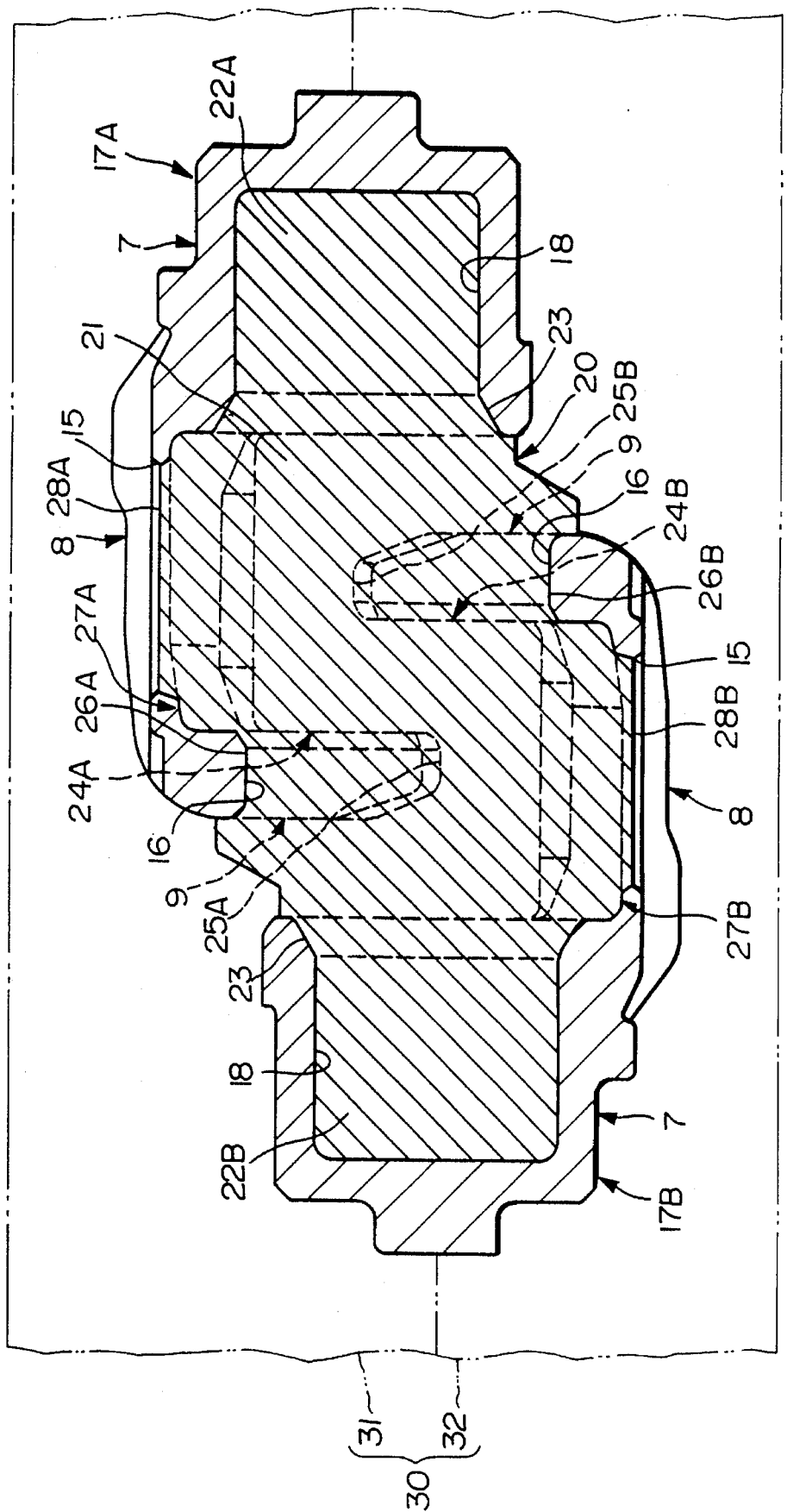
FIG. 4 is a cross sectional view showing the core member and in-situ caliper castings made by the method of the embodiment of making caliper castings of the present invention.

The caliper castings 17A, 17B, shown in FIG. 4, refer to the in-situ starting cast materials for making the caliper 6 before it is subjected to machining and other finishing steps. As shown in FIG. 4, the cylinder section 7 in the caliper forms 17A, 17B is provided with a hole section 18 having an extra material allowing for machining of the engagement hole. However, there are no other specific parts which require post-casting machining steps in the caliper castings 17A, 17B. An example of the parts which require post-casting machining is the bolt hole 11 on the arm section 10 of the cylinder section 7. Therefore, such parts which require machine finishing steps are not indicated in FIG. 4.

A core member 20 which is used for making the caliper castings 17A, 17B by a casting process is made of a material which is not damaged by the processes of pouring of molten metal and solidification, but which can be removed relatively easily by destruction after the solidification.

As shown by hatching in FIG. 4, the core member 20 is provided with a middle section 21 having a first axial section 22A and a second axial section 22B at its each end. The first axial section 22A and the second axial section 22B, whose axes are aligned parallel to each other, are provided for the purpose of making the hole section 18, and are cylindrical-shaped. The sizes of the axial sections 22A, 22B are made in accordance with the size requirement of the hole section 18. That is, the boundary region in the middle section 21 of the first axial section 22A is provided with a taper section 23 so that the side closer to the middle section 21 has a larger diameter. Similarly, the boundary region in the middle section 21 of the second axial section 22B is provided with a taper section 23 having a larger diameter on the side closer to the middle section 21.

On the outer peripheral section of the middle section 21 crossing at right angles to the axis of the first axial section 22A, there is formed a first depression section 24A. The first depression section 24A is shaped as a depression starting from the outer peripheral surface of the middle section 21, and crossing the axis of the first axial section 22A at about right angles. The first depression section 24A is provided for the purpose of making the teeth section 9 of the first caliper casting 17A whose hole section 18 is formed by the first axial section 22A. An extension line of the axis of the first axial section 22A intersects the mid-point of the first depression section 24A extending in the circumferential direction of the disc 1 (the direction at right angles to the paper in FIG. 4). The intersection point serves as a reference point for the caliper casting 17A. The inside dimension of the disc pass section 8, i.e. the distance of separation between the boundary section (separating the first axial section 22A and the middle section 21) and the first depression section 24A is determined in accordance with the dimension between the cylinder section 7 and the teeth section 9 for the caliper form 17A.

Further in this embodiment, a groove section 16 of a semicircular shape is provided in the circumferential middle region of the teeth section 9 of the first caliper casting 17A, as shown in FIG. 2. Therefore, this requires the formation of a protrusion section 26A of a semi-circular shape on the core member 20 when viewed in the axial direction of the disc 1 (viewed, for example, from the left side of FIG. 4), in the circumferential middle region of the bottom section 25A of the first depression section 24A.

Also, on the outer periphery of the middle section 21 (between the first depression section 24A and the first axial section 22A), a second depression section 24B is formed at a position approximately 180° opposite to the first depression section 24A. The second depression section 24B is formed at about right angles to the axis of the second axial section 22B. The bottom section 25B of the second depression section 24B is formed further inward into the core member 20 (upper region in FIG. 4). The second depression section 24B is for forming the teeth section 9 in the second caliper casting 17B (in this embodiment, it has the same shape and size as the caliper casting 17A) whose hole section 18 is formed by the second axial section 22B. As in the case of the first depression section 24A, the extension line of the axis of the second axial section 22B intersects the mid-point of the second depression section 24B extending in the circumferential direction of the disc 1. The intersection point serves as a reference point for the caliper casting 17B. The distance of separation between the boundary section (separating the second axial section 22B and the middle section 21) and the second depression section 24B is determined in accordance with the distance between the cylinder section 7 and the teeth section 9 for the caliper casting 17B. Further, as in the case of the first depression section 24A, the protrusion section 26B of a semi-circular shape is formed on the core member 20, in the middle region of the bottom section 25B of the second depression section 24B.

The core member 20 has a first internal surface forming section 27A on the outer periphery of the middle section 21 between the first axial section 22A and the first depression section 24A. The first internal surface forming section 27A is for the purpose of forming the internal surface of the disc pass section 8 of the first caliper casting 17A. The first internal surface forming section 27A is provided with an inside window section forming section 28A which protrudes out slightly in the radially outward direction of the disc 1 (upward direction in FIG. 4), and extends in the middle region over a specific distance. The inside window forming section 28A is for the purpose of forming the inside sections of the window section 15, and the outside sections of the window section 15 are formed by the casting mold 30.

On the outer periphery of the middle section 21 (between the second axial section 22B and the second depression section 24B), opposite to the inside window forming section 28A, there is formed a second internal surface-forming section 27B. The second internal surface forming section 27B is for the purpose of forming the internal surfaces of the disc pass section 8 of the second caliper casting 17B. The second internal surface forming section 27B is also provided, similar to the case of the first internal surface forming section 27A, with an inside window section forming section 28B which protrudes out slightly in the radially outward direction of the disc 1 (downward direction in FIG. 4), and extends in the middle region over a specific distance. The inside window forming section 28B is for the purpose of forming the inside sections of the window section 15, and the outside sections of the window section 15 are formed by the casting mold 30. A distance of separation between the first axial section 22A and the second axial section B is preferably chosen so as to increase the distance between the first depression section 24A and the adjacent second internal surface forming section 27B as well as the distance between the second depression section 24B and the adjacent first internal surface forming section 27A.

The core member 20 has a mirror symmetry with respect to a plane containing the axes of the first axial section 22A and the second axial section 22B. This configuration affords a high degree of flexibility in the placement of the caliper castings 17A, 17B within the casting mold 31. For example, the dimension between the first depression section 24A and the second internal surface forming section 27B, and the dimension between the second depression section 24B and the first internal surface forming section 27A can be made large to provide appropriate strength to the core member 20.

For making the caliper castings 17A, 17B, the core member 20 of the above described configuration is placed inside an outer sand mold 30. The outer mold 30 provides a framework for making the outer parts including the arm section 10 of the cylinder section 7, and the outer parts including the outer parts of the window section 15 of the disc pass section 8. The outer mold 30 is divided into an upper mold section 31 and a lower mold section 32. As shown by the line separating the two mold sections 31 32, the upper mold 31 molds the upper half section of the cylinder section 7 of the first caliper casting 17A; the outer parts of the disc pass section 8 of the first caliper 17A; and the upper half section of the cylinder section of the second caliper casting 17B. The lower mold section 32 molds the lower half section of the cylinder section 7 of the second caliper casting 17B; the outer parts of the disc pass section 8 of the second caliper casting 17B; and the lower half section of the cylinder section 7 of the first caliper casting 17A.

In preparation for casting operation, the core member 20 is placed inside the outer mold 30 by closing the upper mold section 31 on the lower mold section 32. The core member 20 is held firmly by the middle section 21 contacting the outer mold 30°. The regions of contact between the outer mold 30 and the middle section 21 are, for example, the regions which are radially further outward of the first depression section 24A and the second depression section 24B of the teeth section 9 of the middle section 21. In FIG. 4, this is the direction at right angles to the plane of the paper. Disposing the core member 20 in this configuration in the outer mold 30 produces the independent hole spaces necessary for making the first caliper casting 17A and the second caliper casting 17B. A spout (not shown) to communicate the outside environment with the hole spaces is provided on the outer mold 30.

The casting step is performed by pouring molten metals such as FCD (spheroidal graphite cast iron) into the mold through the spout. When the molten metal is solidified, the mold is opened, the outer sand is removed and the core member 20 is destructively removed to produce the first caliper casting 17A and the second caliper casting 17B.

As described above, according to the method of making caliper castings using the core member and the casting method of the present invention, the first axial section 22A, the first depression section 24A and the first internal surface forming section 27A of one core member 20 produces the hole section 18 of the cylinder section 7, the teeth section 9 and the internal surfaces of the disc pass section 8 of the first caliper casting 17A. At the same time, the second axial section 22B, the second depression section 24B and the second internal surface forming section 27B of the same core member 20 produces the hole section 8 of the cylinder section 7, the teeth section 9 and the internal surfaces of the disc pass section 8 of the second caliper casting 17B. Furthermore, one set (upper and lower mold sections) of outer mold 30 is able to produce the outside parts, excepting the above-mentioned parts, of the first caliper casting 17A and the second caliper casting 17B.

It has therefore been demonstrated that one core member 20 in combination with one set of outer mold 30 is sufficient to produce two caliper castings 17A, 17B. This invention therefore enabled to reduce the production cost to nearly half of the conventional process, by reducing the effort required per caliper casting to prepare core member 20, the outer mold 30 including the labor and material costs involved in processing the parts.

Further feature of the method of producing the caliper castings is that the second depression section 24B is disposed so that it roughly opposes the first depression section 24A as well as the fact that it is disposed between the first depression section 24A and the first axial section 22A. Therefore, it is possible to reduce the length of the middle section 21 of the core member 20 (the length along the axial sections 22A, 22B). Furthermore, the bottom section 25B of the second depression section 24B is disposed further inside the mold than the bottom section 25A of the first depression section 24A. Therefore, it becomes possible to reduce the distance between the first internal surface forming section 27A and the second internal surface forming section 27B. It follows therefore, that the size of the core member 20 can be reduced, and that the size of the outer mold can also be reduced. This leads to an increased yield per mold, and the overall cost of making the core member 20 and the outer mold can be normalized over a larger number of caliper castings, thus leading to even more savings in the production cost.

Figure 5:
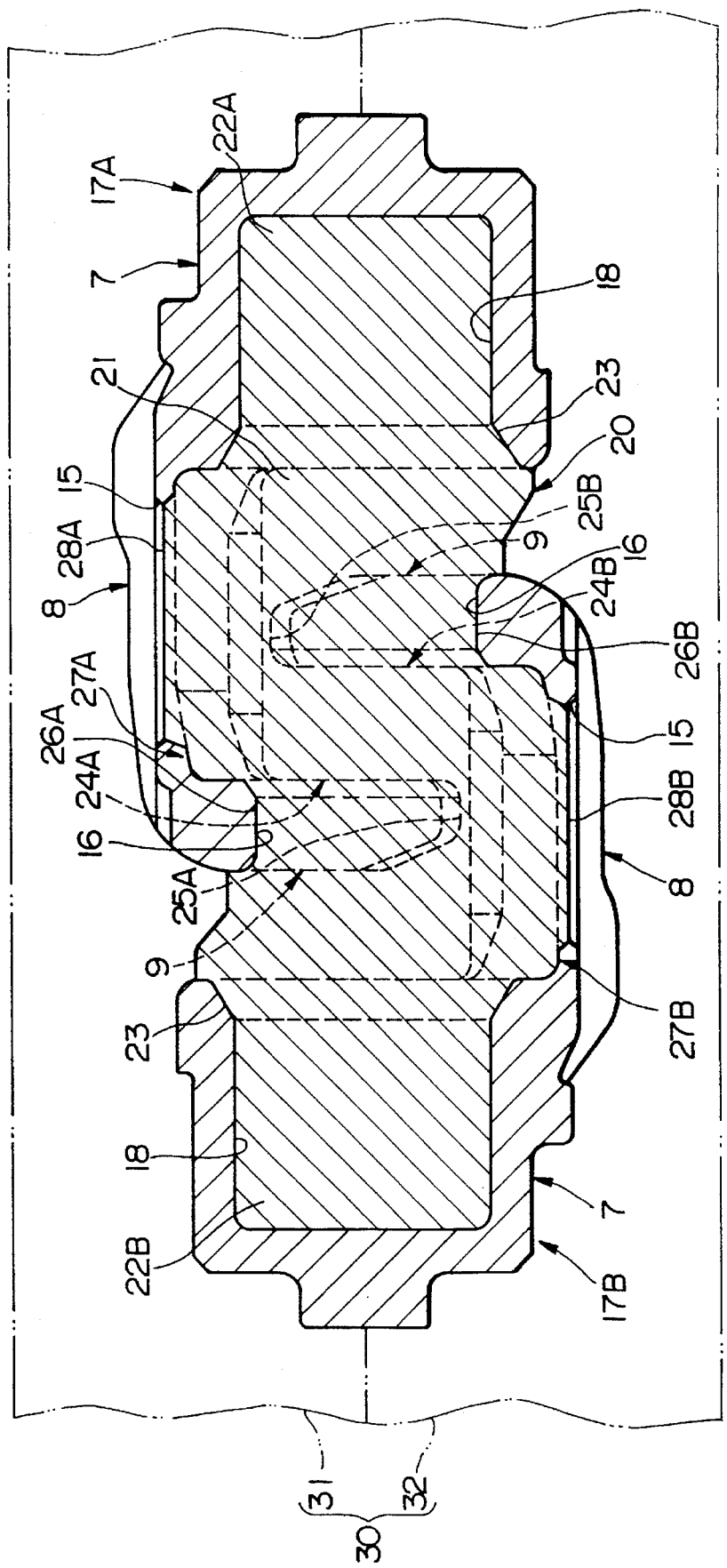
FIG. 5 is a cross sectional view showing the core member and in-situ caliper forms made by the method of the other embodiment of making caliper forms of the present invention.

It should be noted that the first axial section 22A and the second axial section 22B can be placed on a common axis, as shown in FIG. 5, provided that such a design will not present casting problems.

What is claimed is:

1. A core member for making two caliper castings, (17A, 17B) by metal casting for the production of a caliper having a cylinder section having a hole section; a disc pass section extending from the vicinity of the opening section of the hole section of said cylinder section along the axis of said hole section; a teeth section opposing the opening section of said cylinder section, and extending from the region opposite to said cylinder section of said disc pass section to the opening section of said hole section, said core member comprising:

(a) a first axial section (22A) and a second axial section (22B) formed on each end of said core member for making the respective hole section of one caliper casting (17A) and another caliper casting (17B), wherein a respective axis of said first axial section and a respective axis of said second axial section are aligned parallel to each other;

(b) a first depression section (24A) for making said teeth section of one caliper casting, oriented in a direction at right angles to the respective axes of said first axial section and said second axial section, disposed in a middle section (21) between said first axial section and said second axial section;

(c) a second depression section (24B) for making said teeth section of another caliper casting, oriented in a direction at right angles to the respective axes of said first axial section and said second axial section, disposed in the middle section (21) between said first depression section and said first axial section;

(d) a first internal surface forming section (27A) for making the internal surfaces of said disc pass section of one caliper casting, formed on the outer periphery of the middle section between the first axial section and said first depression section;

(e) a second internal surface forming section (27B) for making the internal surfaces of said disc pass section of another caliper casting, formed on the outer periphery of the middle section between the second axial section and said second depression section.

2. A core member as claimed in claim 1, wherein a respective axis of said first axial section 22A and a respective axis of said second axial section 22B are aligned coaxially.

3. A core member as claimed in claim 1, wherein said second depression section is disposed opposite to said first depression section.

4. A core member as claimed in claim 2, wherein said second depression section is disposed opposite to said first depression section.

5. A core member as claimed in claim 1, wherein the distance of separation between the first axial section and the second axial section is chosen so as to increase the distance between the first depression section and the adjacent second internal surface forming section as well as the distance between the second depression section and-the adjacent first internal surface forming section.

6. A core member as claimed in claim 3, wherein the distance of separation between the first axial section and the second axial section is chosen so as to increase the distance between the first depression section and the adjacent second internal surface forming section as well as the distance between the second depression section and the adjacent first internal surface forming section.

7. A core member as claimed in one of claims 1 to 6, wherein said core member is removable destructively.

8. A method of making two caliper castings by a metal casting process comprising the steps of:

placing a core member between an upper mold section (31) and a lower mold section (32) of an outer mold (30);

pouring molten metal into the outer mold through a spout provided on the outer mold;

allowing the molten metal to solidify, and removing the core member destructively to produce two caliper castings the core member comprising:

(a) a first axial section (22A) and a second axial section (22B) formed on each end of said core member for making the respective hole section of one caliper casting (17A) and another caliper casting (17B), wherein a respective axis of said first axial section and a respective axis of said second axial section are aligned parallel to each other;

(b) a first depression section (24A) for making said teeth section of one caliper casting, oriented in a direction at right angles to the respective axes of said first axial section and said second axial section, disposed in a middle section (21) between said first axial section and said second axial section;

(c) a second depression section (24B) opposing said first depression section for making said teeth section of another caliper casting, oriented in a direction at right angles to the respective axes of said first axial section and said second axial section, disposed in the middle section (21) between said first depression section and said first axial section;

(d) a first internal surface forming section (27A) for making the internal surfaces of said disc pass section of one caliper casting, formed on the outer periphery of the middle section between the first axial section and said first depression section;

(e) a second internal surface forming section (27B) for making the internal surfaces of said disc pass section of another caliper casting, formed on the outer periphery of the middle section between the second axial section and said second depression section.

9. A method of making caliper castings by a casting process claimed in claim 8, wherein a respective axis of said first axial section and a respective axis of said second axial section are aligned coaxially.

* * * * *